Patented Mar. 4, 1941

2,233,531

UNITED STATES PATENT OFFICE 2,233,531

CROTONIC ACID-ISOBUTYLAMINE RESIN AND PROCESS OF PRODUCING THE SAME

Almon G. Hovey, Birmingham, and Theodore S. Hodgins, Royal Oak, Mich., assignors to Reichhold Chemicals, Inc., formerly Beck, Koller & Company, Inc., Detroit, Mich.

No Drawing. Application December 10, 1938, Serial No. 245,018

6 Claims. (Cl. 260—2)

The invention relates broadly to improvements in resinous acid-amine condensation products, and the process of making the same, the present application being a continuation-in-part of our copending application Serial No. 147,569 filed June 10, 1937, now Patent No. 2,153,801, dated April 11, 1939.

We have discovered that particularly valuable resinous products having distinctive qualities rendering them suitable for various commercial purposes may be produced by reacting crotonic acid with isobutylamine.

The following specific example is set forth as illustrative of the invention:

Example

One mol of crotonic acid was fused with one mol of isobutylamine for 7 minutes at 80–160° C. without excessive foaming, producing a bright light red resin having a curing cycle of 7 seconds on the hot plate at 200° C. This product was limited to alcohols for solubility, being insoluble in water, acetone, toluol and mineral spirits. It lends itself well to use as a sizing and as wood sealers since it is only soluble in alcohol.

We claim:

1. A condensation product formed by fusing together crotonic acid and isobutylamine until a resinous reaction product is obtained, said acid and amine constituting the principal reacting ingredients.

2. A resinous reaction product formed by reacting one mol of isobutylamine and one mol of crotonic acid, said acid and said amine constituting the principal reacting ingredients, the product being soluble in alcohols, but insoluble in water, acetone, toluol and mineral spirits.

3. A process which comprises fusing together crotonic acid and isobutylamine until a resinous reaction product is obtained, said acid and said amine constituting the principal reacting ingredients.

4. A process as set forth in claim 3, wherein equi-molecular quantities of crotonic acid and isobutylamine are reacted together.

5. A process as set forth in claim 3, wherein the reacting materials are fused together at 80–160° C. without excessive foaming.

6. A process of producing a resin which comprises fusing together one mol of isobutylamine and one mol of crotonic acid for about 7 minutes at 80–160° C. without excessive foaming.

ALMON G. HOVEY.
THEODORE S. HODGINS.